United States Patent [19]

Lindsay

[11] 4,018,542

[45] Apr. 19, 1977

[54] ADJUSTABLE TOOL HOLDER FOR BORING BAR

[76] Inventor: Harold W. Lindsay, 2480 NW. Vaughn, Portland, Oreg. 97210

[22] Filed: June 3, 1976

[21] Appl. No.: 692,429

[52] U.S. Cl. .............................. 408/153; 408/181; 408/185
[51] Int. Cl.² ...................................... B23B 29/02
[58] Field of Search .......... 408/153, 179, 181, 185

[56] References Cited

UNITED STATES PATENTS

| 2,274,244 | 2/1942 | Miller | 408/185 |
| 2,282,919 | 5/1942 | Zempel | 408/181 |
| 2,359,210 | 9/1944 | Engel | 408/185 |
| 2,359,957 | 10/1944 | Zempel | 408/181 |
| 2,800,041 | 7/1957 | Sten | 408/185 |
| 3,309,946 | 3/1967 | Thomas | 408/153 |

FOREIGN PATENTS OR APPLICATIONS

| 1,266,970 | 6/1961 | France | 408/153 |

Primary Examiner—Leonidas Vlachos
Attorney, Agent, or Firm—Klarquist, Sparkman, Campbell, Leigh, Hall & Whinston

[57] ABSTRACT

An adjustable tool holder for a boring bar has a first shank portion including a cutting tip keyed to a second shank portion to form a torsionally unitary cutting tool of constant exterior dimension receivable in a cylindrical bore in the boring bar. An adjusting screw is threadedly received in an axially extending bore in the first shank portion. The screw has an annular laterally enlarged head received and rotatable in an enlarged portion of the bore disposed in the second shank portion. An annular retaining bushing is press fit in a socket in the end of the second shank portion. The bushing retains the head of the adjusting screw within the enlarged portion of the axial bore, whereby rotation of the screw advances or retracts the first shank portion axially with respect to the second shank portion to a desired cutting position, the keying means between the mating shank portions preventing relative rotation therebetween.

3 Claims, 3 Drawing Figures

ADJUSTABLE TOOL HOLDER FOR BORING BAR

BACKGROUND OF THE INVENTION

This invention relates to rotary boring tools for use in boring operations and, more particularly, to tools in which a boring bar is provided with a generally radially disposed tool holder adjustable generally radially of the boring bar.

Adjustable tool holders have generally required complicated machining operations in the boring bars in which they have been received. Keyways, chamfers and bores of varying diameter have generally been required to receive the tool holder and permit the same to be adjusted in axial dimension to the required fine tolerance. Correspondingly, the adjustable tool holders themselves have been complex, requiring complex assembly procedures to install them in the boring bar.

Accordingly, it is a principal object of the present invention to provide an adjustable tool holder for a boring bar that will only require the drilling and reaming of one constant diameter cylindrical bore in the boring bar.

It is a further object of the present invention to provide an adjustable tool holder comprising a unitary structure after assembly, thereby easily to be inserted and received in the boring bar.

It is a still further object of the present invention to provide an adjustable tool holder of the type described that will be of constant outer dimension along its entire length.

It is a still further object of the present invention to provide an adjustable tool holder of the type described including a shank comprising two mating parts, the two parts being keyed together to prevent relative rotation therebetween without the necessity of any keying means in the boring bar itself.

SUMMARY OF THE INVENTION

In accordance with the aforementioned objects, I have provided an adjustable tool holder for a boring bar wherein the boring bar has a constant diameter cylindrical boar extending therein. The tool holder itself comprises a first shank portion and a cutting tip disposed at the cutting end thereof. A second shank portion is positioned at the other end of the first shank portion and is adapted to mate therewith. The first and second shank portions have cross sections which are identical in exterior dimension and comform to the cross section of the bore in the boring bar, whereby the shank portions are axially slidable with respect to the bore.

A key is disposed on the mating end of one of the first and second shank portions and a keyway is disposed on the mating end of the other of such portions. The key is adapted to be received in the keyway whereby the two shank portions are prevented from axial rotation with respect to each other. The first and second shank portions thus cooperate when in their mating position to form a torsionally unitary cutting tool of constant exterior dimension along the length thereof.

An axial bore is disposed in the first and second shank portions, the bore extending axially partially into the first shank portion and being screw-threaded therein. The bore extends axially completely through the second shank portion, having a first lateral enlargement disposed within said second shank portion to provide a first annular shoulder and a first axial extent of enlarged circular cross section therebeyond. The axial bore has a second lateral enlargement disposed within the second shank portion adjacent to the first lateral enlargement and extending to the end of the second shank portion, such second lateral enlargement thus providing a second annular shoulder adjacent the first lateral enlargement and a socket of still further enlarged circular cross section at the end of the second shank portion.

An adjusting screw is threadedly received in the axial bore in the first shank portion, the adjusting screw having an annular laterally enlarged head received and rotatable in the first axial extent of enlarged cross section in the second shank portion, the head abutting the first annular shoulder.

Annular retaining means are disposed in the socket in the second shank portion, such annular retaining means abutting the second annular shoulder and being adapted axially to retain the head of the adjusting screw in abutting relation with the first annular shoulder. In this manner rotation of the adjusting screw is accomplished without axial movement thereof, advancing or retracting the first shank portion axially with respect to the second shank portion to any desired cutting position within the bore in the boring bar.

First locking screw means are disposed in the boring bar and are operable to exert lateral pressure on the second shank portion, thereby to lock the same in a given position in the bore in the boring bar. Second locking screw means are disposed in the boring bar and are operable to exert lateral pressure on the first shank portion to lock the same in the bore when such first shank portion has been advanced or retracted to its desired cutting position.

The annular retaining means desirably comprises an annular retaining bushing press fit in the socket in the second shank portion, such annular retaining means being adapted to retain the adjusting screw in a fixed axial position as above described.

DESCRIPTION OF THE PREFERRED EMBODIMENT

Figure 1:
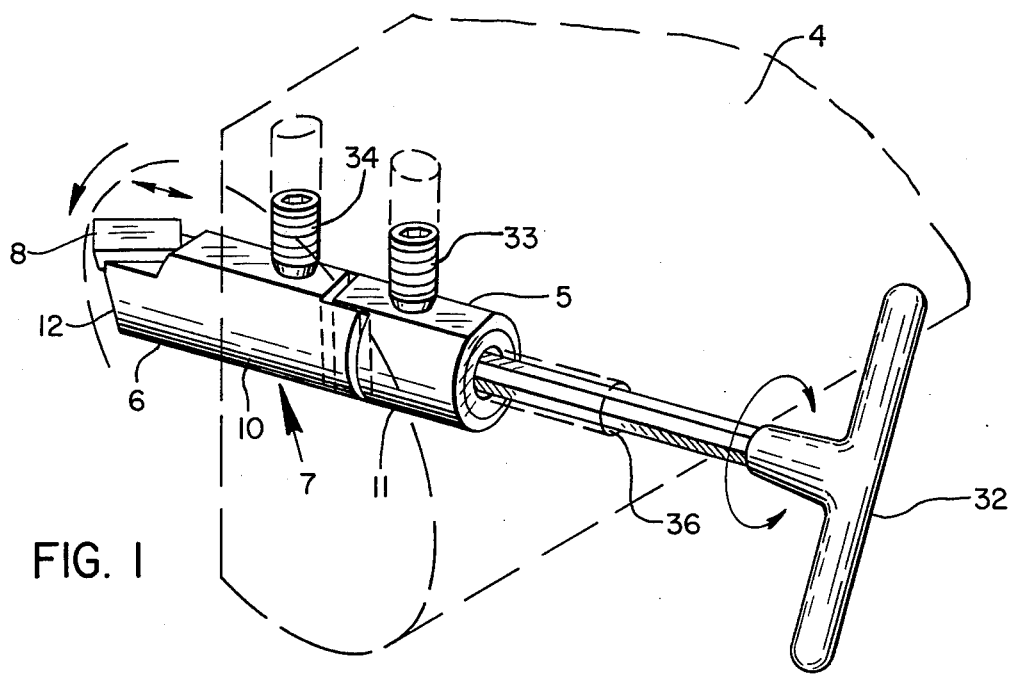
FIG. 1 is a perspective view of the adjustable tool holder of the present invention positioned in a boring bar.
Figure 2:
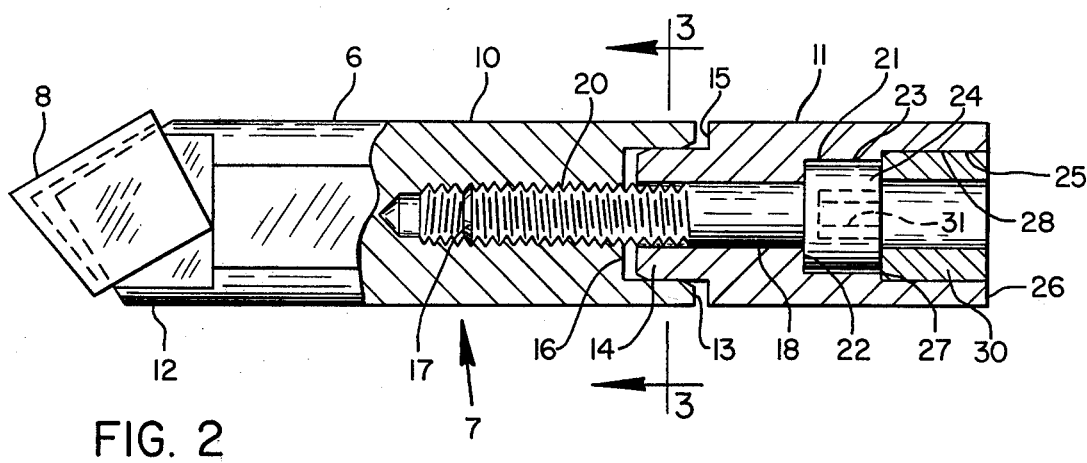
FIG. 2 is a side elevational view with parts broken away of the adjustable tool holder illustrated in FIG. 1.
Figure 3:
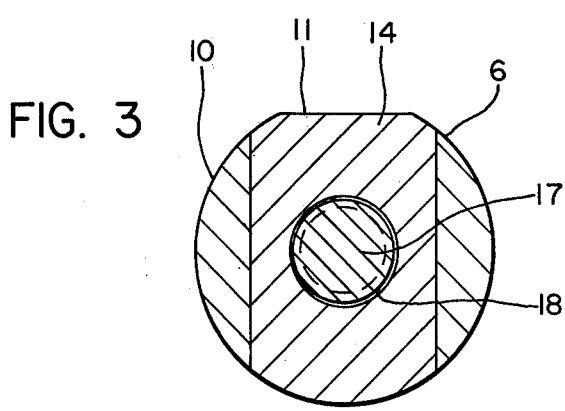
FIG. 3 is a sectional view taken on line 3—3 of FIG. 2.

As illustrated, the invention comprises a boring bar 4 having a constant diameter drilled and reamed cylindrical bore 5 extended therein. Bore 5 is of a dimension suitable to receive in sliding engagement the shank 6 of an adjustable cutting tool 7 of compatible constant exterior cross sectional dimension along its entire length. In the illustrated embodiment the tool holder 7 has a carbide cutting tip 8 disposed at one end in a manner well known to those skilled in this art.

The shank 6 of the cutting tool 7 comprises two mating parts, a first shank portion 10 and a second shank portion 11, the two shank portions 10, 11 cooperating to form a unitary member of constant outer dimension along its entire length.

The first shank portion 10 includes the cutting tip 8 at its forward or cutting end 12 as hereinbefore mentioned. The second shank portion 11 is positioned at the rear or other end 13 of the first shank portion 10. The two shank portions 10, 11 have cross sections which are the same in exterior dimension and these cross sections are compatible with and conform to the bore 5 in the boring bar 4, whereby the tool 7 is axially slidable in the bore 5. The exterior shape of the two shank portions 10, 11 may be circular or polygonal, and if the latter includes round corners for compatibility with the bore 5.

A key 14 is machined on the interior mating end 15 of the second shank portion 11 and a corresponding keyway 16 is machined in the mating rear end 13 of the first shank portion 10, the keyway 16 being adapted to receive the key 14 when the two shank portions 10, 11 are in mating engagement, whereby they are prevented from axial rotation with respect to each other. In this manner the two shank portions 10, 11 are keyed together to form a torsionally unitary shank 6 for the adjustable tool holder and which shank 6 is of constant exterior dimension along its entire length.

Axial adjustment of the length of the tool 7 is accomplished by means of an adjusting screw 17 threadedly received in an axial bore 18 disposed in the first and second shank portions 10, 11 as hereinafter described. The first shank portion 10 is drilled and tapped axially longitudinally from its rear end 13 to provide an internally threaded cylindrical bore 20 extending axially partially thereinto. The bore 18 extends axially and cylindrically into the second shank portion and extends completely therethrough. A first cylindrical enlargement 21 in the second shank portion 11 provides a first annular shoulder 22 and a cylindrical portion 23 of enlarged cross section to receive the enlarged head 24 of the adjusting screw 17 therein. The shoulder 22 prevents axial movement of the screw 17 inwardly with respect to the first shank portion 10 while permitting free rotation thereof with respect to the second shank portion 11.

The bore 18 is further provided with a second cylindrical enlargement 25 within the second shank portion 11 rearwardly and outwardly of the first lateral enlargement 21. The enlargement 25 extends to the end 26 of the second shank portion 11, thus to provide a second annular shoulder 27 and a socket 28 at end 26 of the second shank portion 11.

An annular retaining bushing 30 is press fit into the socket 28 in the second shank portion 11 in abutting relationship with the second annular shoulder 27. The bushing 30 is adapted axially to retain the screw 17 in fixed axial position with respect to the second shank portion 11, maintaining the head 24 thereof in abutting relation with the first annular shoulder 22, and preventing any withdrawal of the screw 17 from the second shank portion 11 as would occur without the presence of the bushing. The bushing is press fit into the socket against the shoulder 27, but does not press against the screw head 24 so as to prevent free rotation thereof. The heat 24 is preferably provided with a hexagonal socket 31 for receiving a hex wrench 32, whereby the screw 17 may be rotated to advance or retract the first shank portion 10 axially with respect to the second shank portion 11 and to a desired cutting position within the bore 5 in the boring bar 4. Preferably, the screw 17 is threaded to move the first shank portion 10 axially with respect to the second shank portion 0.025 inch per revolution.

The invention permits easy radial adjustment and locking of the tool 7 in the bore of the boring bar 4. As can be seen in FIG. 1, a first locking set screw 33 is disposed in the boring bar 4 such that when tightened, it is operable to exert lateral pressure on the second shank portion 11 and to lock the same in a given position in the bore, such position being approximately that required to place the cutting tip 8 in the desired cutting position.

A second locking set screw 34 is provided in the boring bar 4 and is operable to exert lateral pressure on the first shank portion 10, being tightened only after the first shank portion 10 is adjusted to its correct axial position by means of rotation of the adjusting screw 17. Once the two set screws 33, 34 are tightened, the tool 7 is firmly anchored in position, ready for operation.

It is thus noted that all that is required in the bar 4 is a drilled and reamed constant diameter bore 5 to accommodate the constant exterior dimension tool holder 7. The only other machining required in the bar is an access bore 36 for the hex wrench 32 to be able to rotate the adjusting screw 17. No keyway is required in the boring bar, nor need the bore 5 include any enlargements or variations in internal cross ssection such as chamfers or of the like. The tool holder 7 is also seen to comprise a unitary member subsequent to assembly, being received as such unitary member within the bore in the boring bar, thereby to facilitate insertion, removal and replacement.

I claim:

1. In a boring tool, the combination of a boring bar having a constant diameter cylindrical bore extending therein; and a cutting tool disposed within said bore, said tool comprising a first shank portion;

a cutting tip disposed at one end of said first shank portion;

a second shank portion positioned at the other end of said first shank portion and adapted to mate therewith, said first and second shank portions having cross sections which are equal in exterior dimension, said cross sections conforming to the cross section of said bore in said boring bar, whereby said shank portions are axially slidable with respect to said bore;

a key disposed on the mating end of one of said first and second shank portions;

a keyway disposed on the mating end of the other of said first and second shank portions, said keyway being adapted to receive said key, whereby said shank portions are prevented from axial rotation with respect to each other when said key is received in said keyway, said first and second shank portions cooperating to form a torsionally unitary cutting tool of constant exterior dimension along the entire length thereof;

an axial bore disposed in said first and second shank portions;

said bore extending axially partially into said first shank portion and being screw-threaded therein;

said bore extending axially completely through said second shank portion;

said axial bore having a first lateral enlargement disposed within said second shank portion to provide a first annular shoulder and a first axial extent of enlarged circular cross section therebeyond;

said axial bore having a second lateral enlargement disposed within said second shank portion adjacent said first lateral enlargement and extending to the end of said second shank portion, said second lateral enlargement providing a second annular shoulder adjacent said first lateral enlargement and a socket of still further enlarged circular cross section at the end of said second shank portion; an adjusting screw threadedly received in said axial bore in said first shank portion;

said adjusting screw having an annular laterally enlarged head received and rotatably in said first axial extent of enlarged cross section in said second shank portion, said head abutting said first annular shoulder; and annular retaining means disposed in said socket in said second shank portion;

said annular retaining means abutting said second annular shoulder and being adapted axially to retain said head of said adjusting screw in abutting relation with said first annular shoulder, whereby rotation of said adjusting screw advances or retracts said first shank portion axially with respect to said second shank portion to a desired cutting position within said bore in said boring bar.

2. In the combination of claim 1, first locking screw means disposed in said boring bar and operable to exert lateral pressure on said second shank portion and lock the same in a given position in said bore in said boring bar; and second locking screw means disposed in said boring bar and operable to exert lateral pressure on said first shank portion to lock the same in said bore in said boring bar when said first shank portion has been advanced or retracted to said desired cutting position therein.

3. The combination of claim 1 in which said annular retaining means comprises an annular retaining bushing press fit in said socket in said second shank portion.

* * * * *

UNITED STATES PATENT OFFICE
CERTIFICATE OF CORRECTION

PATENT NO. : 4,018,542
DATED : April 19, 1977
INVENTOR(S) : HAROLD W. LINDSAY

It is certified that error appears in the above-identified patent and that said Letters Patent are hereby corrected as shown below:

Column 1, line 43 "boar" should be --bore--

Column 1, line 49 "comform" should be --conform--

Column 2, line 57 "extended" should be --extending--

Column 3, line 62 "heat" should be --head--

Column 4, line 27 after "or" delete "of"

Signed and Sealed this fifth Day of July 1977

[SEAL]

Attest:

RUTH C. MASON
Attesting Officer

C. MARSHALL DANN
Commissioner of Patents and Trademarks